United States Patent [19]

Young

[11] 4,184,101
[45] Jan. 15, 1980

[54] COMPACT FLUORESCENT LAMP HAVING A PARTITIONED ENVELOPE

[75] Inventor: Robert G. Young, Nutley, N.J.

[73] Assignee: Westinghouse Electric Corp., Pittsburgh, Pa.

[21] Appl. No.: 923,526

[22] Filed: Jul. 11, 1978

[51] Int. Cl.² .................. H01J 61/10; H01J 61/30; H01J 61/42

[52] U.S. Cl. .................. 313/485; 313/190; 313/204; 313/493

[58] Field of Search ............. 313/493, 204, 485, 190

[56] References Cited

U.S. PATENT DOCUMENTS

| | | |
|---|---|---|
| Re. 22,896 | 7/1947 | Polevitzky . |
| 2,121,333 | 6/1938 | Barclay . |
| 2,133,205 | 10/1938 | McCauley . |
| 2,306,628 | 12/1942 | Lemmers ............................ 313/204 |
| 2,451,043 | 10/1948 | Pennybacker .................. 313/204 X |
| 2,824,993 | 2/1958 | DeVriend et al. . |
| 3,024,383 | 3/1962 | Doering ............................ 313/204 |
| 3,194,997 | 7/1965 | Waly ............................. 313/204 X |
| 3,508,103 | 4/1970 | Young . |
| 3,609,436 | 9/1971 | Campbell . |
| 3,903,447 | 9/1975 | Young et al. ...................... 313/493 |

FOREIGN PATENT DOCUMENTS 481085 8/1975 U.S.S.R. .................. 313/204

Primary Examiner—Palmer C. Demeo
Attorney, Agent, or Firm—D. S. Buleza

[57] ABSTRACT

The envelope of a fluorescent lamp is provided with a partition assembly of sheet metal or other rigid material that is inserted into the envelope and forces the art discharge to follow a tortuous path which is longer than the envelope, thus reducing the size of the lamp and providing a concentrated light source. The inherent tendency of the arc to bypass the partition by seeking and passing through small gaps or crevices between the envelope wall and the mating edges of the partition assembly is prevented by providing the longitudinal edges of the partition assembly with short laterally-extending flanges that are seated against or closely overlie the envelope wall. The resulting lengthening of the arc-leakage paths through such gaps or crevices creates a "barrier" along the envelope-partition interface which cannot be breached by the arc. Short-circuiting of the arc around the end portion of the partition assembly is prevented by a diaphragm component comprising a transverse panel member that is secured to the partition assembly and has a peripheral flange that makes a snug fit with the side walls of the envelope. The diaphragm component can also comprise a compliant pad-like gasket of porous material that is held in nested relationship with the end portion of the partition assembly by retaining means.

12 Claims, 8 Drawing Figures

COMPACT FLUORESCENT LAMP HAVING A PARTITIONED ENVELOPE

CROSS-REFERENCE TO RELATED APPLICATIONS

The subject matter of this application constitutes an improvement over that disclosed and claimed in concurrently-filed application Ser. No. 923,527 of R. G. Young, the author of the present invention, and it is also related to the subject matter disclosed and claimed in another concurrently filed application Ser. No. 923,599 of R. G. Young, which applications are assigned to the same assignee as the present application.

BACKGROUND OF THE INVENTION

1. Field of the Invention

This invention relates to electric discharge lamps and has particular reference to an improved fluorescent lamp of compact size and high brightness that is suitable for use as a replacement for incandescent lamps of the type employed in residential and commercial lighting fixtures.

2. Description of the Prior Art

Electric discharge lamps having envelopes which are internally partitioned to provide one or more elongated discharge paths are generally well known in the art. U.S. Pat. No. 2,121,333 issued June 21, 1938 to Barclay discloses such a lamp having glass panels which are joined to the glass envelope and serve as the partition means. U.S. Pat. No. 3,024,383 issued Mar. 6, 1962 to Doering discloses the use of a thin sheet of glass or ceramic, or a stiffened sheet of fiberglass or the like, as the partition component for a fluorescent lamp. The partition is supported by a disc-like base member that is seated on top of the stem and short-circuiting of the arc is prevented by thickening the edges and/or elastically seating the edges of a glasstextile or fiberglass partition against the envelope walls, or by providing the edges of a rigid partition with a compressible or elastic border or lining of fiberglass.

Fluorescent lamps having partitions that are fabricated from sheet metal which is coated with phosphor are also known in the art and are disclosed in U.S. Pat. Re. 22,896 issued July 8, 1947 to Polevitzky and U.S. Pat. No. 3,508,103 issued Apr. 21, 1970 to Young, the author of the present invention. A single-ended fluorescent lamp which contains a concentric glass partition of cylindrical configuration and several electrodes which are sequentially energized in such a manner that the arc passes through the cylindrical partition and sweeps around the annular chamber between the partition and the envelope is disclosed in U.S. Pat. No. 3,609,436 issued Sept. 28, 1971 to Campbell.

Low-pressure discharge lamps of doubled-ended construction that contain a filler component comprising a grooved glass rod, a series of mica discs or glass wool that is located in the space between the electrodes and causes the discharge to follow different paths in random fashion and thus produce a changing or animated luminous effect are described in U.S. Pat. No. 2,133,205 issued Oct. 11, 1938 to McCauley. A fluorescent lamp that contains plugs of glass or metal wool, metal foil, or glass tubes which fill the chambers behind the electrodes at the ends of the envelope and prevent the lamp from triggering an explosion in mines or similar environments, should the glass envelope be broken, is disclosed in U.S. Pat. No. 2,824,993 issued Feb. 25, 1958 to DeVriend et al.

SUMMARY OF THE INVENTION

While the prior art partition lamps were satisfactory from a functional standpoint in that they increased the length of the discharge and provided fluorescent lamps of sufficient brightness to permit their use as replacements for incandescent lamps in various lighting applications, they were difficult and expensive to manufacture on a mass-production basis and had certain features which presented serious quality control problems. The use of rigid partition members that are sealed to the walls of the glass envelope, for example, frequently introduced strains in the glass which could cause the envelope to crack under certain conditions. The use of a stiff disc of solid material as a transverse support member for the partition assembly also made it very difficult to evacuate water vapor and other gaseous impurities from the envelope during lamp manufacture. The purging of such impurities is of crucial importance in the manufacture of fluorescent and similar type lamps since the presence of even minute amounts of such impurities will drastically affect both the light output and useful life of the lamp. The inherent tendency of the arc to seek out and pass through small gaps or crevices between the edges of the partition and walls of the envelope and thus bypass the partition also constituted a serious problem in the production of the prior art lamp designs.

All of the foregoing problems are overcome or avoided in accordance with the present invention by providing the longitudinal edges of the partition assembly with short flanges that effect a snug fit with and laterally extend along the wall of the envelope a distance such that the length of the arc-leakage path through any small gaps or crevices that may exist along the envelope-partition interface is increased sufficiently to prevent the arc from penetrating and passing through the gaps or crevices. The short flanges thus create "barriers" to the arc which effectively seal the longitudinal edges of the partition and force the discharge to follow the desired elongated path. Short-circuiting of the arc around the end portion of the partition is prevented by securing it to a rigid septum or diaphragm component that extends transversely across the interior of the envelope and has a continuous peripheral flange that also closely overlies and is preferably seated against the surrounding wall portions of the envelope. The diaphragm component is provided with one or more openings to permit the envelope to be readily evacuated during lamp manufacture and the "arc-blocking" integrity of the diaphragm is preserved by lining it with a layer of porous material that is permeable to gases and water vapor but prevents passage of the arc.

In accordance with an alternative lamp embodiment, the diaphragm component comprises a pad-like gasket of compliant fibrous material that is disposed between holding means which keeps it in nested relationship with the end portion of the partition assembly so that it extends across the envelope interior and has its peripheral edge in contact with the surrounding side walls of the envelope.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENTS

While the present invention can be advantageously employed in various kinds of electric discharge lamps that have partitioned envelopes and require some means for confining the arc to an elongated path without interfering with the evacuation of vaporous and gaseous impurities during lamp manufacture, it is particularly adapted for use in conjunction with low-pressure type electric discharge lamps, such as single-ended or double-ended fluorescent lamps, and it has accordingly been so illustrated and will be so described.

Figure 1:
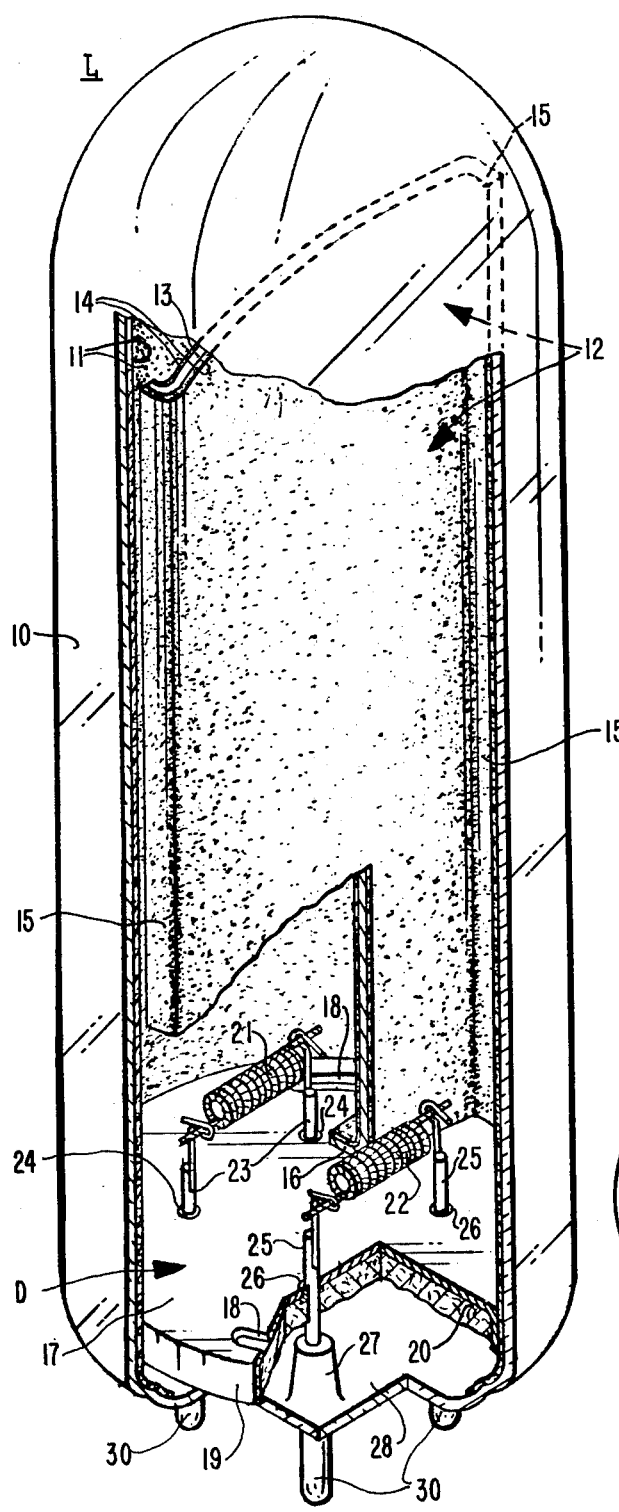
FIG. 1 is a pictorial view of a single-ended fluorescent lamp that embodies the invention, portions of the envelope and various components being removed for illustrative purposes.

A fluorescent lamp L of the single-ended variety which embodies the invention is shown in FIG. 1 and consists of a tubular glass envelope 10 of circular cross-section that has a dome-shaped end and a coating 11 of a suitable ultraviolet-responsive phosphor on its inner surface. A partition assembly 12 consisting of a panel 13 of relatively rigid material (such as glas, ceramic, fiberglass or a suitable sheet metal) extends longitudinally within the envelope 10 and is also coated with a suitable ultraviolet-responsive phosphor 14. The end portion of the partition 12 is secured to a diaphragm component D which includes a rigid panel member 17 that extends transversely across the interior of the envelope 10 and thus serves both as a support means and as a septum or bulkhead. A pair of thermionic electrodes, such as coiled tungsten-wire cathodes 21 and 22, are disposed on opposite sides of the partition 12 and are held in such position by suitable conductors such as pairs of lead-in wires 23 and 25 which are hermetically sealed through bosses 27 of a glass wafer-type stem 28 that is sealed to and terminates the envelope 10. The outer ends of the lead-in conductors are connected to suitable contact means such as metal pins 30 that are anchored in the stem bosses 27 and serve as the lamp terminals.

The envelope 10 contains an ionizable medium consisting of a suitable starting or fill gas, such as argon at a pressure of several torr, and a measured quantity of mercury that sustains a low-pressure electric discharge when the lamp L is energized. The discharge originates at one of the electrodes and terminates at the other electrode after passing along and around the partition 12 through the domed end of the envelope 10. The partition 12 thus divides the envelope interior into a discharge channel of U-shaped configuration and provides an arc path that is approximately twice as long as the overall length of the envelope 10. The mercury-vapor discharge generates ultraviolet radiations which excites the phosphor coatings 11 and 14 on the envelope walls and partition and thus provides a concentrated light source of high brightness and efficacy.

While the partition 12 can be fabricated from any suitable planar material 13, it is preferably made from sheet metal such as stainless steel, nickel-iron alloy or nickel having a thickness of approximately 0.13 millimeter. The partition assembly is of such size that it has to be forcibly inserted into the envelope 10 with its longitudinal edges in abutting engagement with the envelope walls.

Figure 2:
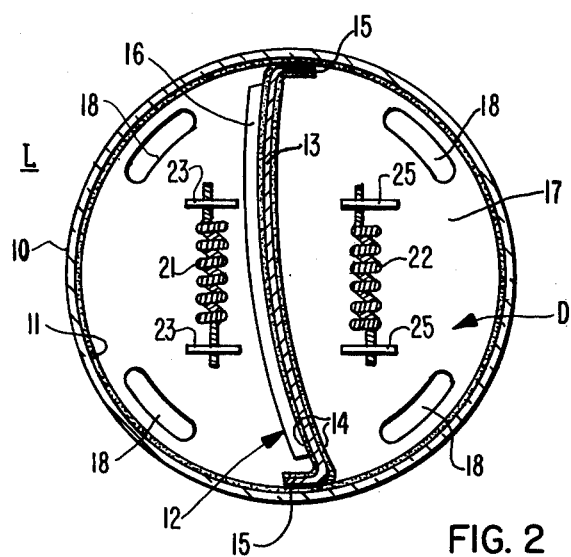
FIG. 2 is a cross-sectional view through the partitioned portion of the lamp shown in FIG. 1.

In accordance with the present invention, the tendency of the arc to penetrate interstitial gaps or crevices between the edges of the partition 12 and side walls of the envelope 10 and thus bypass the partition is eliminated by providing the longitudinal edges of the partition with tab-like segments such as short flanges 15 that extend laterally along the envelope walls and are seated against or closely overlie such walls. As shown more particularly in FIG. 2, when the partition 12 is made of resilient material such as sheet metal, its width is preferably such that the partition is slightly bowed and forces the flanges 15 into firm engagement with the walls of the envelope 10.

Experience has shown that the use of such flanges increases the length of the arc-leakage path through any small gaps or crevices that may occur along the envelope-partition interface (due to surface irregularities, dimensional variations of the parts, etc.) by an amount such that the arc cannot penetrate the gaps or crevices and is forced to follow the longer U-shaped channel. In the case of nickel sheet having a thickness of approximately 0.13 millimeter, the use of flanges having a width of about 5 millimeters increased the "arc-traverse" dimension of such interstitial gaps from about 0.13 millimeter to approximately 5 millimeters. This was more than sufficient to stop the arc from passing through such small gaps and cracks, thus providing a barrier which effectively "seals off" the longitudinal edges of the partition from arc penetration without rigidly fastening or joining the partition to the envelope walls.

The flange width is not critical and narrower flanges can be used, as indicated by the fact that tests conducted with sheet metal partitions 16.6 centimeters long and about 0.13 millimeter thick having flanges with a width that varied from 2 to 5 millimeters were not short-circuited by the arc when the partitions were inserted into fluorescent lamps having envelopes 20 centimeters long and 3.5 centimeters inside diameter.

In addition to eliminating the need for a very tight and precise fit between the envelope 10 and the inserted partition 12, the use of a flanged partition to eliminate the arc "short-circuiting" problem in accordance with the present invention provides another important manufacturing advantage since reliance on a filler material such as an extra layer of phosphor coating along the envelope-partition interface is no longer required to close all of the minute cracks or gaps that may occur between the two components. The envelope and partition can thus be coated with phosphor in separate operations and then be assembled in their pre-coated condition.

The direct passage of the arc discharge from one electrode to the other around the intervening end portion of the partition 12 is avoided in accordance with the invention by also fabricating the diaphragm member 17 from sheet metal (or the same material as the partition) and providing an additional flange 16 on the end of the partition 12, which additional flange is then welded or otherwise secured (as by one or more interfitting pins) in tight overlapped relationship with the diaphragm. The two components are thus firmly seated one against the other along the end flange 16, as shown most clearly in FIGS. 2 and 3—thereby providing another "barrier" which extends all along the bottom edge of the partition 12 and prevents the arc from passing directly between the cathodes 21 and 22. If the diaphragm member 17 is composed of sheet metal, suitable insulators 24 and 26 of ceramic or other electrically non-conductive material (see FIGS. 1 and 3) are inserted into the openings in the metal diaphragm to prevent short-circuiting the lead-in wires 23 and 25.

Figure 4:
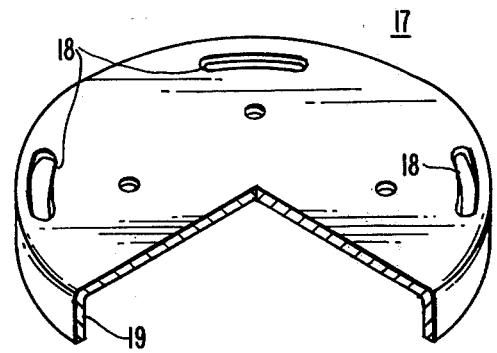
FIG. 4 is a pictorial view of the flanged diaphragm component employed in the lamp shown in FIGS. 1–3.
Figure 3:
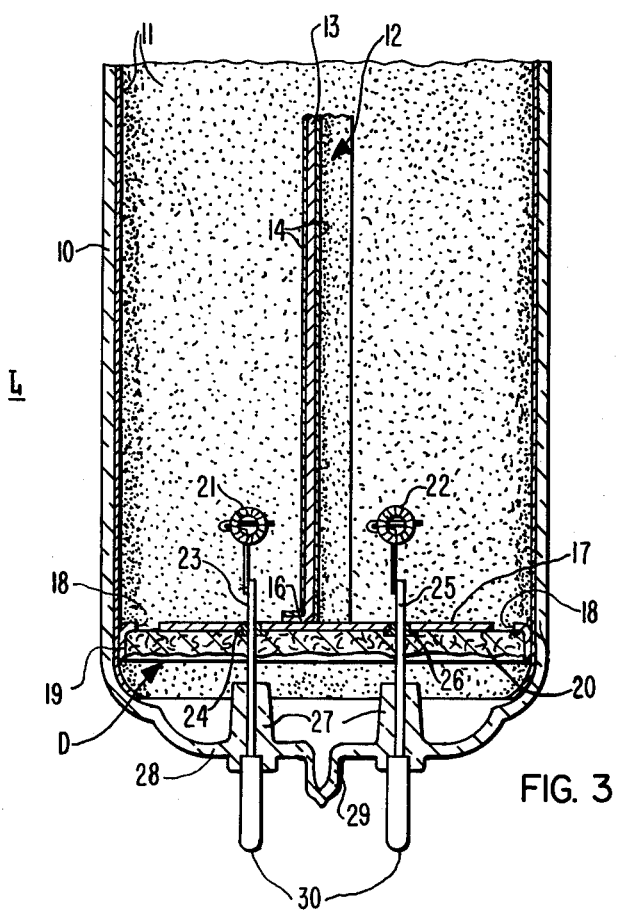
FIG. 3 is a longitudinal sectional view of the sealed end portion of the lamp shown in FIGS. 1 and 2.

As will be noted in FIGS. 1 and 4, the diaphragm member 17 has a continuous laterally-extending flange 19 which overlies, and preferably is seated against, the surrounding wall portion of the envelope (as shown in FIG. 3). The flange 19, accordingly, establishes an additional "barrier" which prevents the arc from leaking through any cracks or gaps between the periphery of the diaphragm component D and the mating side walls of the envelope 10.

As illustrated in FIG. 3, the wafer-like stem 28 has a protruding tipped-off glass tubulation 29 which permits the envelope 10 to be evacuated and then charged with starting gas and dosed mercury in the usual manner. In order to prevent the diaphragm component D from interfering with the rapid evacuation of water vapor and gaseous impurities, a series of ports such as slot openings 18 (best shown in FIGS. 2 and 4) are provided along the periphery of the diaphragm member 17 at locations remote from the partition flange 16. A liner, such as a layer or pad 20 of porous material, is placed within the cup-shaped diaphragm 17 to serve as a gas-permeable component which permits the envelope 10 to be evacuated and then filled with starting gas, but still prevents the discharge from passing directly between the cathodes 21 and 22 through the openings 18 in the diaphragm 17.

While the porous liner or pad 20 can be fabricated from any suitable material (such as glass wool or quartz wool) that is electrically non-conductive and will not short out the lead-in wires 23 and 25, excellent results have been obtained by using a pad made from interlocked ceramic fibers, such as a felt material composed of silica and alumina fibers marketed under the trade name "Fiberfrax" ceramic fiber by the Carborundum Company, Niagara Falls, New York. With such material, a pad thickness of from about 1 to 5 millimeters is sufficient to provide the required degree of permeability for envelope-evacuation purposes and the necessary protection against arc penetration.

Figure 5:
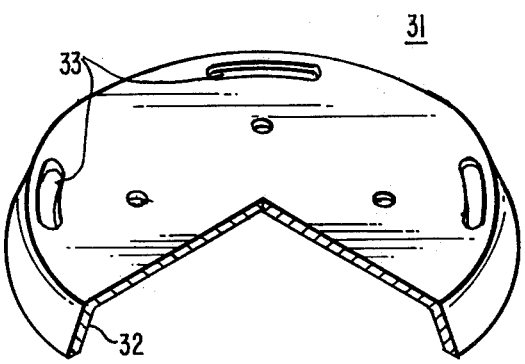
FIG. 5 is a similar view of an alternative flanged diaphragm component.

An alternate sheet-metal diaphragm member 31 is shown in FIG. 5. As illustrated, it has an outwardly-flared continuous flange 32 which permits a closer mechanical fit with the inner surface of the tubular envelope 10 and also provides a flexible-interfit that compensates for any dimensional variations or imperfections in the envelope and/or diaphragm. A series of circumferentially-spaced slot openings or ports 33 are also provided in the diaphragm 31 to permit the rapid passage of vapors and gases during the evacuation and gas-filling operations.

ALTERNATE SINGLE-ENDED FLUORESCENT LAMP EMBODIMENT (FIG. 6)

Figure 6:
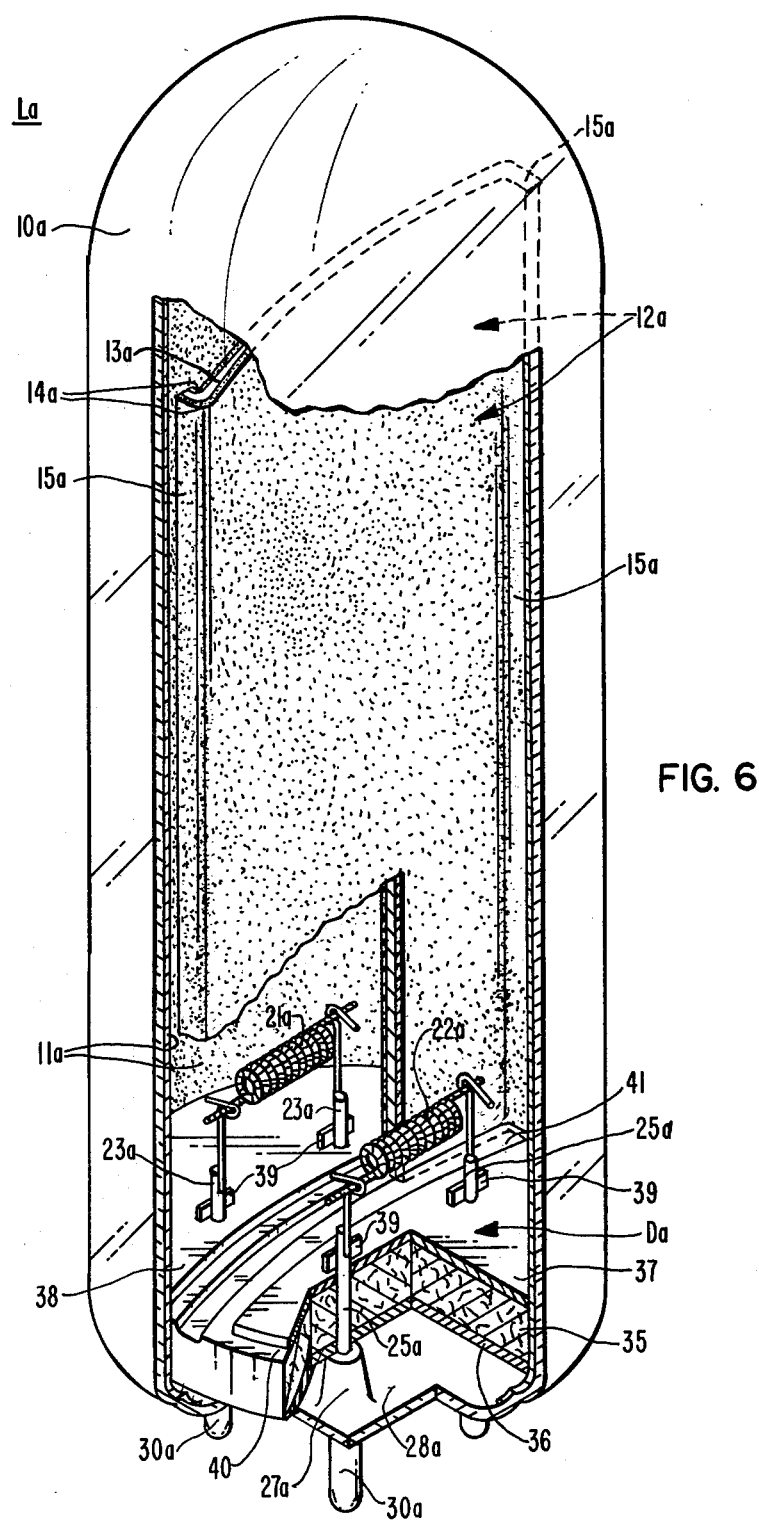
FIG. 6 is a pictorial view of an alternative fluorescent lamp embodiment of single-ended construction that has a modified diaphragm assembly.

Another fluorescent lamp $L_a$ of single-ended construction having a modified diaphragm assembly $D_a$ is shown in FIG. 6. As in the previous embodiment, lamp $L_a$ includes a tubular glass envelope 10a that contains an inserted flanged partition assembly 12a and a pair of thermionic electrodes 21a and 22a that are disposed on opposite sides of the partition at the sealed end of the lamp. The envelope 10a and partition member 13a are coated with phosphor layers 11a and 14a, respectively, and short-circuiting of the arc around the longitudinal edges of the partition is prevented by providing lateral flanges 15a on the partition, as in the previous embodiment. However, a modified diaphragm assembly $D_a$ is employed in accordance with this embodiment to prevent the arc from passing directly between the electrodes 21a, 22a around the end portion of the partition assembly 12a.

As will be noted, the required arc "barrier" at the electrode end of the lamp $L_a$ is provided by a body of porous material such as a compliant gasket 35 that extends transversely across the envelope interior and contacts the surrounding side walls of the envelope 10a. While the gasket 35 can be fabricated from any suitable electrically non-conductive material, such as glass wool or quartz wool, it is preferably made from the aforementioned "Fiberfrax" ceramic fiber and thus consists of a soft fluffy pad or mat of felt-like material. The gasket 35 surrounds and encloses the lead-in wires 23a and 25a and is preferably held in place by a rigid panel 36 of insulating material, such as mica, that is seated on the stem bosses 27a. A pair of generally semicircular panels 37 and 38 of similar material are locked on top of the porous gasket 35 by a series of metal tabs 39 that are welded to the respective lead-in wires 23a and 25a.

The retaining panels 37 and 38 are spaced from the walls of the envelope 10a and from each other to provide gap openings 40 and 41 which permit water vapor and gaseous impurities to pass through the gasket component 35 of the diaphragm assembly $D_a$ during lamp evacuation and also permit rapid entry of the fill gas. The end portion of the partition 12a extends through the slot-opening 41 and is seated in nested and pressured engagement with the gasket 35, thus "sealing off" the end edge of the partition from exposure to and penetration by the arc discharge. The peripheral edge of the gasket 35 is also seated against (or is at least in contiguous relationship with) the surrounding side wall portions of the envelope 10a to thus establish an arc "barrier" at this location.

DOUBLE-ENDED FLUORESCENT LAMP EMBODIMENT (FIGS. 7-8)

Figure 7:
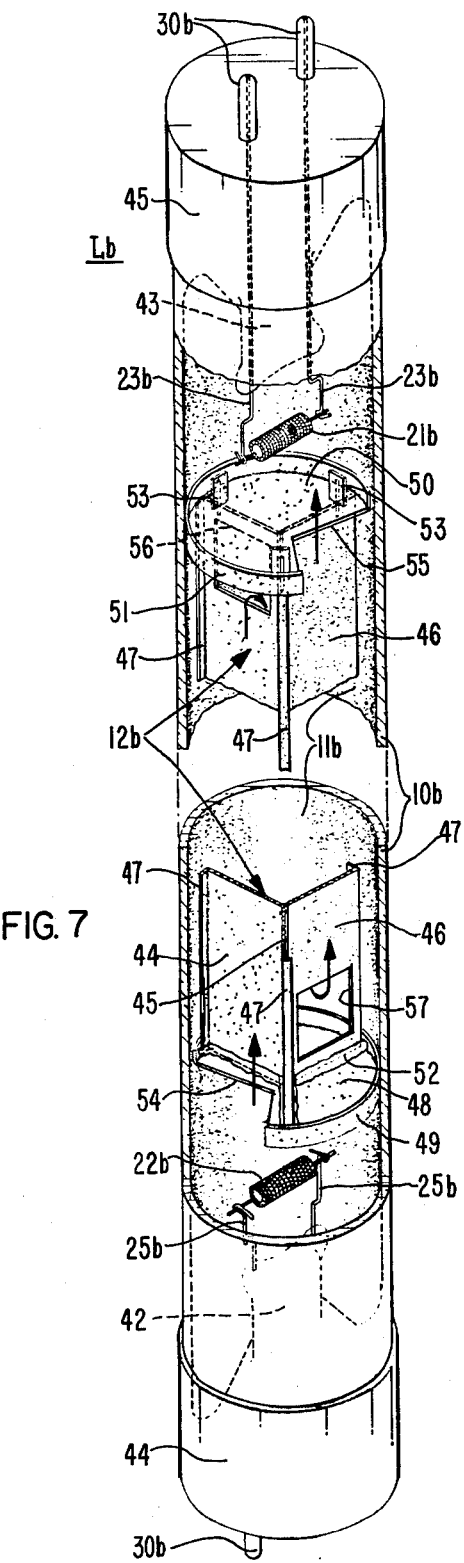
FIG. 7 is a fragmentary perspective view, partly in section, of a double-ended fluorescent lamp embodying the invention.
Figure 8:
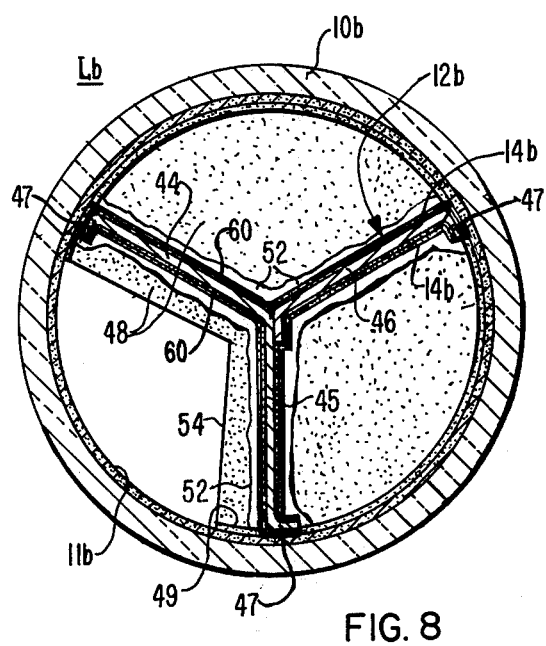
FIG. 8 is an enlarged cross-sectional view through the partitioned portion of the lamp shown in FIG. 7.

The invention is not limited to fluorescent lamps of the single-ended type but can also be employed in double-ended lamps of the type disclosed and claimed in the aforementioned concurrently-filed Young application Ser. No. 923,599 and which thus contains an inserted partition assembly. Such a lamp $L_b$ is shown in FIGS. 7 and 8 and consists of a tubular glass envelope 10b of circular cross-section that is provided with an inner coating 11b of suitable phosphor and includes phosphor-coated a partition assembly 12b that is located between and is spaced from electrodes 21b and 22b which are supported at opposite ends of the envelope by connecting pairs of lead-in wires 23b and 25b, respectively. The lead-in wires are sealed through re-entrant type stems 42 and 43 that are fused to the envelope and the outer ends of the lead-in wires are connected to metal pin terminals 30b that are anchored in suitable bases 44 and 45 attached to the sealed ends of the envelope.

Before the envelope 10b is hermetically sealed by tipping-off a glass tubulation (not shown) that protrudes from one of the stems 43 or 44, water vapor and gaseous impurities are evacuated and the lamp is charged with a suitable fill gas, such as several torr of argon, and dosed with mercury through the tubulation in the usual fashion well known to those skilled in the art.

In contrast to the one-piece planar partition employed in the above-described single-ended fluorescent lamp embodiments, the partition assembly 12b according to this embodiment consists of three planar segments 44, 45 and 46 of suitable sheet material that are joined together and extend longitudinally within the envelope and divide it into three sectors of equal size, as shown in FIG. 8. Each of the planar partition segments is coated with phosphor 14b and is provided with short laterally-extending flanges 47 at their peripheral or longitudinal edges which effect a snug fit with the inner walls of the envelope 10b and prevent the arc from penetrating small cracks or gaps along the envelope-partition interface in the manner described previously.

An end panel or diaphragm component such as a caplike member 18 having a peripheral flange 49 is attached to one end of the partition assembly 12b so that it extends completely across the interior of the envelope 10b and has its flanged rim disposed in snug overlying relationship with the envelope walls. An identical caplike member 50 is secured to the opposite end of the partition assembly and has its peripheral flange 51 similarly seated against the envelope wall. In accordance with the teachings of the aforesaid application Ser. No. 923,599 potential arc-leakage paths through small gaps or fissures along the end edges of the partition panels 44, 45, 46 and the diaphragm end caps 48 and 50 are eliminated by interposing a Y-shaped strip 52 of compliant felt-like material (such as the aforementioned "Fiberfrax" ceramic fiber) between these components and pressing the end edges of the partition segments into nested relationship with the strip. A similar "sealing" strip (not shown) is used on the other diaphragm end cap 50 and the end caps are preferably locked in pressured engagement with the strips 50 by tabs 53 that are secured to pins or similar elements that extend through the respective end caps and are fastened to the respective partition panels.

As shown in FIG. 7, end cap 48 has an angular sector removed to provide an opening 54 which is accessible to electrode 22b and the other end cap 50 also has a sector removed to provide an opening 55 that is angularly offset with respect to opening 54 and is accessible to the other electrode 21b. Partition panel 44 is provided with an opening 56 (which is located adjacent the end cap 50) and panel 46 has an opening 57 at the opposite end of the lamp adjacent the other end cap 48. The various openings in the end caps and partition panels are so arranged that the partition assembly 12b defines a single continuous discharge channel that extends (as indicated by the arrows in FIG. 7) from electrode 22b through cap opening 54, along the partition and through panel opening 56, and back along the partition toward end cap 48, through panel opening 57 along panels 45, 46 and through cap opening 55 to the other electrode 21b.

The flanged partition assembly 12b and flanged end caps or diaphragms 49, 50 thus provide a continuous arc channel which prevents the arc from bypassing any of the partition panels and forces the arc to longitudinally traverse the envelope three times. The arc length is accordingly much longer than the length of the tubular envelope 10b and the light output of the lamp $L_b$ is accordingly much greater than that produced by a conventional fluorescent lamp which has the same bulb length and is operated at the same current. In order to obtain maximum light output and efficacy, all of the surfaces of the envelope 10b, partition assembly 12b and its end caps 48 and 50 that are exposed to the arc discharge are coated with phosphor.

While the partition panels 44, 45, 46 and end caps 48 and 50 may be fabricated from any suitable inert material (such as plates of glass, mica or the like) that will withstand the temperatures involved and will not contaminate the lamp and can also be formed with turned edges to provide "barrier" flanges, they are preferably made from a suitable sheet metal, such as nickel or stainless steel, that is approximately 0.13 millimeter thick. This permits the tripanel partition assembly to be made from only two pieces of metal that are bent and welded together (in the manner shown in FIG. 8) and also permits spot-welding of the pins and tabs used to hold the end caps in place, pursuant to the teachings of the concurrently-filed application Ser. No. 923,599 of Young mentioned previously.

As will be apparent to those skilled in the art, the invention is not limited to single-ended fluorescent lamps that have a single partition which causes the arc to traverse or "pass through" the envelope twice, but includes within its scope lamps having partition structures which force the arc to traverse the envelope four or six times (or any even-number of times). Double-ended fluorescent lamps can also be made with partition assemblies that force the arc to traverse the envelope any odd-number of times—for example, three times (as in the described embodiment), five times, etc.

Excellent results and performance have been obtained with four-pass single-ended fluorescent lamps having phosphor coatings (on both the partitions and envelopes) consisting of a blend of several different phosphors that emit radiations in selected portions of the spectrum and collectively produce a light output that has very good color rendition and other desirable characteristics. As a specific example, the phosphor blend can comprise a mixture of manganese-activated zinc silicate, europium-activated strontium chloroapatite, and europium-activated yttrium oxide.

In order to further enhance the light output of the lamp $L_b$, a thin coating of a suitable light-reflective material is first deposited on the partition assembly 12b before it is coated with the phosphor blend. In the case of partition assemblies fabricated from sheet metal, good results have been obtained by coating the metal surfaces with a thin coating (coating 60 in FIG. 8) of a suitable inert material such as $TiO_2$ which was suspended (as a powder) in a suitable liquid vehicle (such as ethyl cellulose lacquer) and applied in the form of a paint which was subsequently baked along with the phosphor coating to remove the solvents, organic binders, etc. As will be noted in FIG. 8, the titania coating 60 is located between the phosphor coating 14b and the partition and is coextensive with the phosphor coating.

Other suitable materials for the reflective layer are powdered MgO, BaSO$_4$, Al$_2$O$_3$, ZnO and mixtures thereof.

Such an additional reflective coating can, of course, also be used in the single-ended fluorescent lamp embodiments if desired.

I claim as my invention:

1. In a low-pressure electric discharge lamp having a sealed light-transmitting envelope that contains an ionizable medium, a pair of electrodes, and an inserted partition component which defines a continuous discharge channel of tortuous configuration and has peripheral edge portions that are in abutting relationship with the wall of said envelope, the combination of;

means for preventing the electric discharge from passing through interstitial gaps or crevices along the envelope-partition interface and thus bypassing the partition component comprising substantially flat tab-like members that depend from each of the abutted peripheral edge portions of said partition component and extend laterally therefrom a distance along the envelope wall such that the resulting increase in the arc-traverse dimension of said gaps or crevices is sufficient to prevent the electric discharge from entering and penetrating such gaps or crevices, and means for preventing the electric discharge from short-circuiting around the end of the partition component and thus bypassing a portion of the tortuous discharge channel comprising a diaphragm assembly that is disposed in abutting engagement with the end of the partition component and extends transversely across the interior of the envelope and contacts the envelope wall, said diaphragm assembly comprising (a) a porous body of material and (b) a rigid panel member that is in overlying relationship with said porous body and holds it in place within the envelope, said panel member and porous body being so shaped and arranged that the periphery of the diaghragm assembly effects an overlapped type juncture with the envelope wall and thus provides a barrier therealong which is arc-impervious, and said panel member also having an opening therein which permits gaseous impurities to be evacuated from said envelope.

2. The electric discharge lamp of claim 1 wherein the porous body component of said diaphragm assembly comprises a fibrous gasket that extends across the opening in said rigid panel member.

3. The electric discharge lamp of claim 1 wherein;
said ionizable medium comprises a fill gas and a measured quantity of mercury which sustain an arc discharge, when the lamp is energized, that generates ultraviolet radiation,
said envelope is of tubular configuration and has a phosphor coating on its inner surface that is responsive to said ultraviolet radiation and said lamp thus comprises a fluorescent lamp, and
said partition component extends longitudinally within the envelope, and defines a single continuous arc channel that traverses the envelope in retroverted fashion.

4. The fluorescent lamp of claim 3 wherein;
said partition component is also coated with an ultraviolet-responsive phosphor, and
said depending tab-like members comprise flanges that constitute the longitudinal edge segments of the partition component and are thus integral parts of the partition component.

5. The fluorescent lamp of claim 4 wherein said partition component is fabricated from sheet metal and carries a light-reflecting layer of inert powdered material that is disposed beneath the phosphor coating.

6. The fluorescent lamp of claim 4 wherein;
said pair of electrodes are disposed at one end of the envelope and said fluorescent lamp is thus of the single-ended type,
the partition component extends longitudinally within said envelope with the electrodes disposed on opposite sides of the partition component, and
said porous body of material extends along the face of the rigid panel member that is remote from said electrodes, the opening in said panel member being covered by said porous body of material and thereby constituting an arc-barrier thereat.

7. The single-ended fluorescent lamp of claim 6 wherein said rigid panel member comprises a cup-shaped component having a continuous peripheral flange that is disposed in overlying contiguous relationship with the surrounding walls of said envelope, and said porous body of material comprises a pad-like liner that is disposed within said cup-shaped component.

8. The single-ended fluorescent lamp of claim 7 wherein said partition and cup-shaped components are both fabricated from sheet metal and the abutted end portion of the partition component is configured to provide a flange that is seated against the cup-shaped component in tight overlapped relationship therewith.

9. The single-ended fluorescent lamp of claim 6 wherein the porous body component of said diaphragm assembly comprises a compliant gasket that is in nested engagement with the abutted end portion of the partition component and is of such configuration and size that its peripheral edge contacts the surronding walls of the envelope, and said gasket is disposed between said rigid panel member and a pair of retaining panels that overlie the parts of the gasket which are adjacent to the end portion of the partition component.

10. The fluorescent lamp of claim 3 wherein;
said tubular envelope is of elongated configuration with a single electrode at each end and said fluorescent lamp is thus of the double-ended type,
said partition component is disposed in the space between said electrodes and includes a plurality of longitudinally-extending planar segments that are shaped and arranged to define a single arc channel which is continuous and longitudinally traverses the envelope an odd number of times in retroverted fashion,
the planar segments of said partition component are interconnected and form a unitary assembly which has a plurality of longitudinal peripheral portions that are disposed in snug-fitting contiguous relationship with the walls of said envelope and are each terminated by said depending tab-like members, and
said diaphragm assemblies are secured to and terminate the respective ends of said partition assembly, the openings in the panel members of the respective diaphragm assemblies being so located that they permit passage of the arc discharge to the electrode which is disposed at that end of the lamp.

11. The double-ended fluorescent lamp of claim 10 wherein;
said partition assembly is fabricated from sheet metal, said tab-like members are flanges that constitute integral parts of the respective planar segments of the partition assembly, and the rigid panel components of each of said diaphragm assemblies are of cap-like configuration and have a peripheral flange that is in snug-fitting overlying relationship with the surrounding walls of the envelope.

12. The double-ended fluorescent lamp of claim 11 wherein;

the cap-like components of said diaphragm assemblies are also fabricated from sheet metal, and each of said porous bodies comprise a layer of compliant fibrous material that is disposed between the respective cap-like components and the associated abutted end portions of the planar segments of the partition assembly and thus provide junctures thereat which are devoid of arc-leakage paths.

* * * * *